Nov. 25, 1947.  W. B. JOHNSON  2,431,331
TRAILER DOLLY
Filed Jan. 4, 1945  2 Sheets-Sheet 2
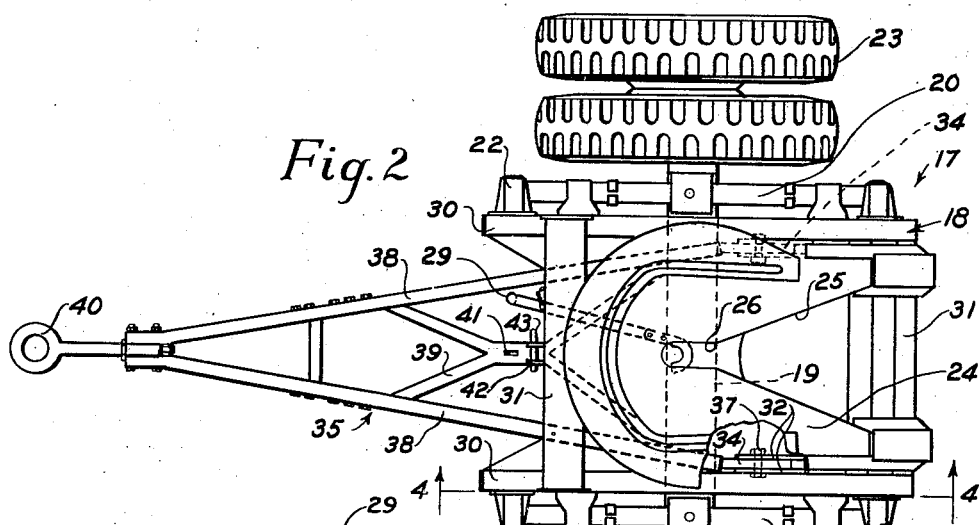
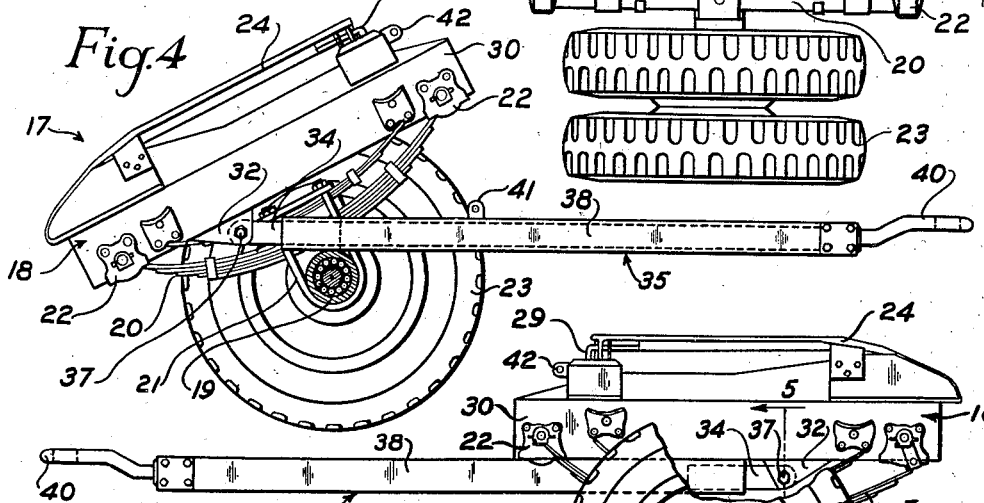
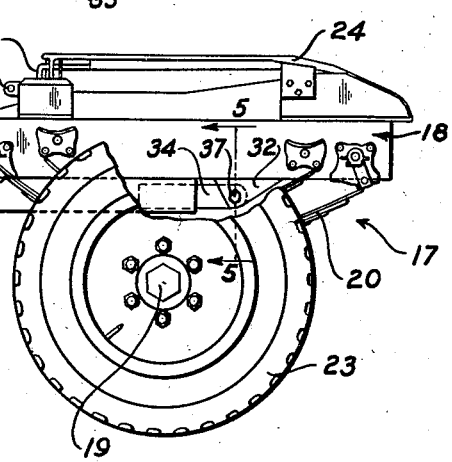
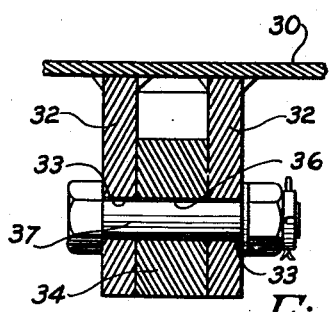
INVENTOR.
WILLIAM B. JOHNSON
BY
ATTORNEYS Patented Nov. 25, 1947

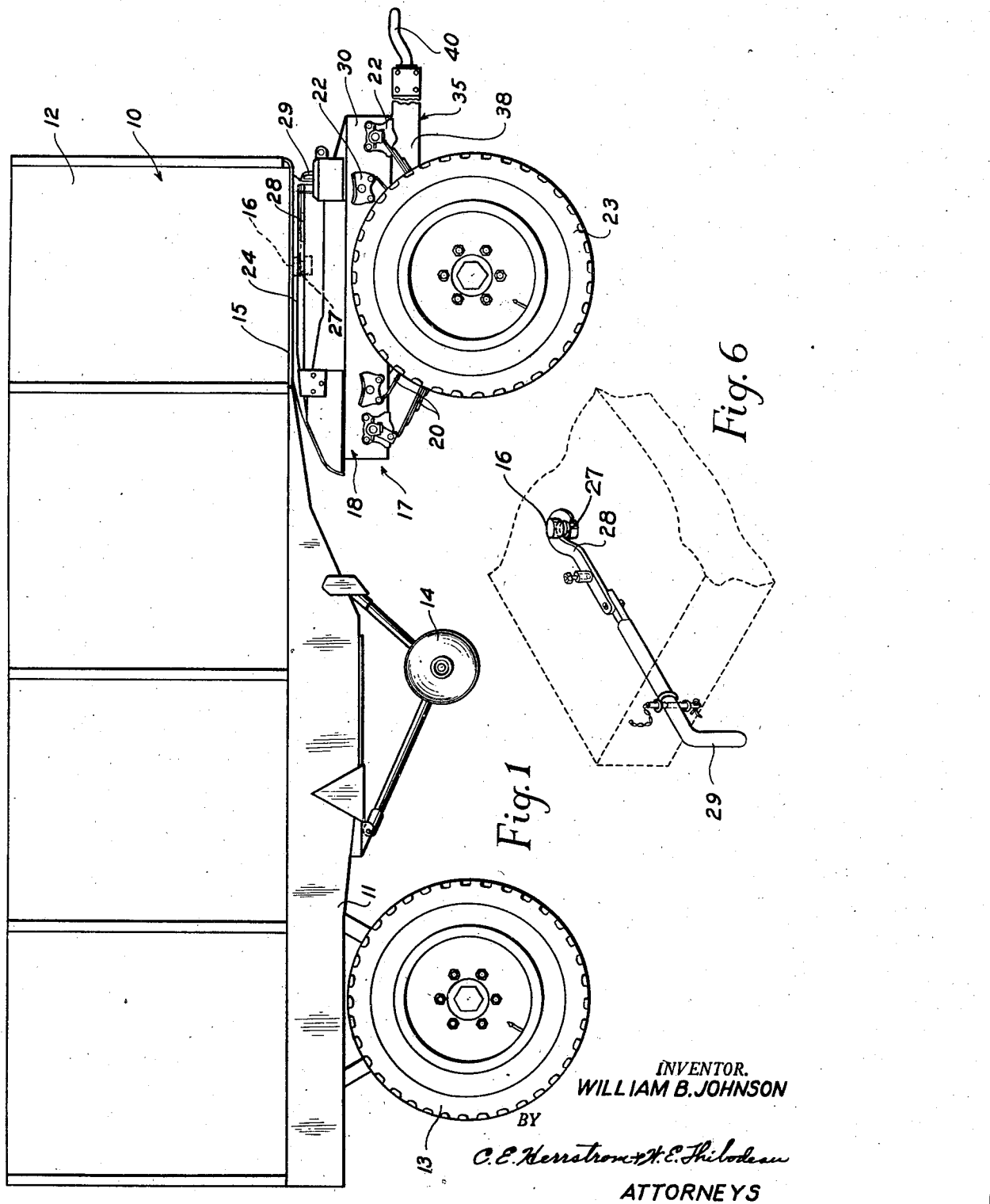

2,431,331

UNITED STATES PATENT OFFICE 2,431,331

TRAILER DOLLY

William B. Johnson, Easley, S. C.

Application January 4, 1945, Serial No. 571,347

8 Claims. (Cl. 280—33.4)

(Granted under the act of March 3, 1883, as amended April 30, 1928; 370 O. G. 757)

The invention described herein may be manufactured and used by or for the Government for governmental purposes, without the payment to me of any royalty thereon.

This invention relates generally to trailer dollies and more particularly to a dolly for converting a semi-trailer into a full trailer.

Heretofore dollies for converting semi-trailers into full trailers have been of two general types, namely a stiff frame type and a short hinged A-frame type. The stiff frame type is provided with a draw bar or an A-frame rigidly connected to the frame of the dolly and with a fifth wheel pivotally mounted upon the frame to permit vertical movement of the towing lunette. This type is difficult and dangerous to handle when the dolly is connected to a semi-trailer and is not supported by the towing vehicle, since the weight of he forward end of the semi-trailer upon the pivoted fifth wheel causes an up or down force to be exerted by the towing lunette if the fifth wheel pivot point is displaced a slight amount from vertical alignment with the axle of the dolly. The short hinged A-frame type of dolly is provided with a fifth wheel rigidly mounted thereon and with a short A-frame or draw bar which is pivotally connected to the front of the dolly. The disadvantages of this type of dolly include a requirement for an alternate pivot point for the short A-frame or draw bar to compensate for vehicles having different height pintles, and the necessity of providing means for locking the dolly frame to the draw bar when towing the dolly separately or when the dolly is not attached to a towing vehicle. In addition this type dolly requires an auxiliary landing wheel to assist in connecting the dolly to a semi-trailer. The auxiliary landing wheel frequently becomes mired in the mud when the dolly is being used on terrain of this nature.

The foregoing disadvantages of existing types of dollies are obviated by the present invention which comprises essentially a dolly having a fifth wheel rigidly attached to the frame and provided with a long draw bar or A-frame, the rearward end of which is pivotally attached to the frame of the dolly a predetemined distance above and in back of the dolly axle. The long tow bar enables the dolly to be used with towing vehicles having pintles mounted at different heights. This eliminates the necessity for providing alternate pivot points for the draw bar. Pivoting the draw bar above and in back of the axle eliminates the requirement for locking the draw bar when towing the dolly alone as the draw bar engages either the axle or the frame or fifth wheel of the dolly, thus supporting the latter. In addition, the requirement for an auxiliary landing wheel is eliminated, saving considerable material and mechanism and simplifying operations on muddy terrain.

Attachment of the semi-trailer to the dolly is greatly facilitated with the present construction. The lunette is first attached to the towing vehicle, and the dolly is then tilted to the rear until the draw bar rests upon the axle and the fifth wheel assumes a position at an acute angle with the draw bar. The dolly is then lined up with the semi-trailer so that the king pin on the latter is guided into the V-opening of the dolly fifth wheel when the dolly is backed underneath the semi-trailer. Since the draw bar is pivotally attached to the dolly frame back of the axle the dolly fifth wheel readily slips up against the plate provided on the trailer.

Other advantages of the present invention will be made more apparent as this description proceeds, particularly when considered in connection with the accompanying drawings, in which:

Figure 1 is a side elevation of a semi-trailer with the dolly attached;

Figure 2 is a top plan view of the dolly shown in Figure 1;

Figure 3 is a side elevation, partly broken away, of the dolly;

Figure 4 is a side elevation with the axle in section and the right hand wheel removed, illustrating the dolly tilted to the rear ready for attachment to a semi-trailer;

Figure 5 is a vertical cross sectional view taken substantially on the plane indicated by the line 5—5 of Figure 3;

Figure 6 is a detail view of the mechanism for locking the dolly to a semi-trailer.

Referring now to the drawings, and particularly to Figure 1, the reference character 10 indicates a semi-trailer of conventional design comprising a frame 11, a cargo carrying body 12 mounted upon the frame, rear wheels 13, and landing wheels 14. The landing wheels 14 are adapted to be lowered into ground engaging position when the forward end of the trailer is not supported upon the dolly. The forward portion of the trailer is provided with a horizontal plate 15, constructed of metal and supporting the king pin 16 depending therefrom substantially centrally of the plate.

Although semi-trailers of this type can be attached directly to a prime mover provided with a fifth wheel, for many purposes and particularly for military use it is desirable to provide a dolly, indicated generally by the reference character 17, for converting the semi-trailer into a full trailer. This enables the trailer to be towed by any type of towing vehicle provided with suitable means for coupling the dolly thereto, such as a pintle.

The dolly 17 has a frame 18 supported upon a transverse axle 19 by means of leaf springs 20 positioned on opposite sides of the dolly. The springs 20 are connected at their centers to the axle 19 in conventional manner by means of the U-bolt 21 and to the frame of the dolly by means of brackets 22 supported thereon. In the present construction two springs are provided at each side of the vehicle to support the load of the semi-trailer. Dual wheels 23 are mounted upon opposite ends of the axle 19.

A conventional fifth wheel 24 is mounted upon the top of the dolly frame 18 and is rigidly attached thereto by welding, bolting or other suitable means. As best seen in Figure 2, the fifth wheel is provided with the usual V-guide opening 25 in its upper surface, narrowing into a slot 26 at its forward end adapted to receive and engage the king pin 16 provided upon the semi-trailer 10. The king pin is provided with an annular groove 27 engaging the upper plate of the fifth wheel 24, and is retained in the slot 26 by means of a suitable latching member 28, the latter being operated by a handle 29 to engage and disengage the latch.

The frame 18 of the dolly has longitudinally extending channel shaped frame members 30 on opposite sides thereof connected together by cross members 31. Welded or otherwise suitably secured to each of the frame members 30, and depending therefrom, are a pair of brackets 32. These brackets are provided with aligned apertures 33 and are spaced from each other a distance sufficient to receive the rearwardly extending legs 34 of the draw bar or A-frame 35. Each leg of the draw bar is apertured at 36 and is pivotally connected to the brackets 32 by means of the bolt 37 extending therethrough.

The legs 34 form extensions of the main converging side members 38 of the draw bar 35 which are connected together by the X-frame 39. Mounted upon the forward end of the draw bar 35 is a lunette eye 40, adapted to be connected to a suitable pintle hook provided upon the towing vehicle.

It will be noted that the draw bar 35 extends between the frame 18 of the dolly and the axle 19 thereof, and is pivotally connected to the brackets 32 at points spaced above and in back of said axle. This permits a relatively long draw bar to be used without substantially lengthening the dolly, thus eliminating the requirement for alternate pivot points as are required with the conventional short A-frame type of dolly to compensate for vehicles having different type pintles. Attachment of the long draw bar to pintles positioned at different heights above the ground does not interfere with the operation of the present dolly.

Figure 3 illustrates the normal position of the dolly with the draw bar and the fifth wheel 24 substantially horizontal. When it is desired to couple the dolly to the semi-trailer 10, which is supported upon the rear wheels 13 and the lowered landing wheels 14, the frame 18 of the dolly and the fifth wheel rigidly attached thereto are tilted rearwardly to the position shown in Figure 4. It is noted that pivotal movement of the dolly is permitted until the draw bar 35 strikes and rests upon the axle 19. Pivotal movement of the draw bar 35 is prevented of course by reason of the attachment of the lunette eye 40 to the towing vehicle. At its rearwardmost position the fifth wheel 24 assumes a position at an acute angle of somewhat less than 45° with the draw bar 35. By suitably designing the dolly and locating the pivot pin 37, which couples the tow bar to the dolly frame, at a predetermined distance above and in back of the axle 19, the extreme angular position of the fifth wheel can be adjusted to that which is most efficient for attachment of the dolly to the semi-trailer.

With the dolly positioned so that the V-guide opening 25 of the fifth wheel is substantially in alignment with the king pin 16 upon the semi-trailer, the towing vehicle is backed toward the semi-trailer and in so doing the inclined fifth wheel of the dolly is brought into sliding engagement with the plate 15 upon the lower surface of the semi-trailer. Further movement of the dolly toward the semi-trailer results in causing the inclined fifth wheel and dolly frame to pivot toward a horizontal position until the fifth wheel is parallel to and in contact with the plate 15. The V-opening 25 in the fifth wheel guides the king pin 16 until the latter reaches the forward end of the slot 26. The handle 29 is then actuated to swing the latch 28 into locking engagement with the king pin thus effectively locking the dolly and the semi-trailer together.

It will be seen that there is no necessity for providing an auxiliary landing wheel upon the present dolly, as is required in the case of the short hinged A-frame type of dolly in which such a wheel must be used when coupling the dolly to a semi-trailer since no other means are provided for controlling the angular position of the fifth wheel. This not only eliminates considerable mechanism and effects a saving in initial cost and maintenance, but avoids the difficulty commonly encountered in having the auxiliary landing wheel become mired in soft ground, particularly when the vehicle is being used under military conditions.

Normally with the present construction it is unnecessary to lock the draw bar to the dolly when towing the latter separately as engagement of the draw bar 35 against either the axle 19 or the frame 18 limits the angular movement of the dolly frame and fifth wheel. If desired however, such a lock may be provided, but need only be used when the dolly is to be towed independently for long distances. As best seen in Figures 2 and 4 the lock comprises an apertured lug 41 extending upwardly from the X-frame member 39 of the draw bar and a bifurcated bracket 42 secured to the cross member 31 of the dolly frame. The bifurcations of the bracket 42 are provided with openings adapted to receive a locking pin 43 when the lug 41 and bracket 42 are in alignment, thus preventing relative movement between the frame of the dolly and the draw bar. Inasmuch as the fifth wheel is rigidly mounted upon the dolly frame, the dolly will not tip when attached to a semi-trailer and disassembled from the towing vehicle, as will a dolly of the stiff frame type in which the fifth wheel is pivotally mounted thereon for oscillation. Furthermore, there is little or no tendency for the weight of the semi-trailer upon the fifth wheel to cause an up or down force to be exerted by the towing lunette upon the pintle hook attached to the towing vehicle. This is true because of the pivotal connection between the draw bar and the dolly, and is a definite improvement over the type of dolly provided with a pivoted fifth wheel, since with the latter type a substantial force up or down is exerted by the towing lunette whenever the hinge-point of the fifth wheel is not in vertical alignment with the dolly axle, but is offset therefrom.

The long draw bar possible with the present construction exerts considerably less pressure upon the head of the king pin than in the conventional type of dolly, and has for less tendency to damage the fifth wheel on the dolly or the adjacent plate on the semi-trailer. This is due to the material reduction in the angle through which the draw bar must operate, and also to a reduction in leverage gained through pivoting the draw bar back of the king pin and the dolly axle. In this connection it should be noted that the forward end of the slot 26 in the dolly fifth wheel is substantially in vertical alignment with the axle of the dolly. This results in locating the king pin of the semi-trailer directly over the dolly axle in normal operation.

The simplicity of the present construction, and the few moving parts which are required, not only reduce the initial cost of the dolly but greatly simplify maintenance work.

Although I have shown and described certain embodiments of the invention, it will be understood that I do not wish to be limited to the exact construction shown and described, but that various changes and modifications may be made without departing from the scope and spirit of my invention as defined in the appended claims.

What I claim is:

1. A trailer dolly for converting a semi-trailer into a full trailer comprising a frame, an axle for said frame, wheels mounted on said axle, a fifth wheel on said frame, and a draw bar pivotally attached to said frame at a point back of said axle.

2. A trailer dolly for converting a semi-trailer into a full trailer comprising a frame, an axle for said frame, wheels mounted on said axle, a fifth wheel rigidly mounted on said frame, and a draw bar pivotally attached to said frame at a point back of said axle.

3. A trailer dolly for converting a semi-trailer into a full trailer comprising a frame, an axle for said frame, wheels mounted on said axle, a fifth wheel on said frame, and a draw bar pivotally attached to said frame at a point above and back of said axle.

4. A trailer dolly for converting a semi-trailer into a full trailer comprising a frame, an axle for said frame, wheels mounted on said axle, a fifth wheel on said frame, and a draw bar extending beneath said frame and above said axle, said draw bar being pivotally attached to said frame at a point above and back of said axle.

5. A trailer dolly for converting a semi-trailer into a full trailer comprising a frame, an axle for said frame, wheels mounted on said axle, a fifth wheel on said frame, a bracket depending from said frame in back of and above said axle, and a draw bar extending above said axle and pivotally connected to said bracket.

6. A trailer dolly for converting a semi-trailer into a full trailer comprising a frame, an axle, a pair of leaf springs on opposite sides of said dolly connecting said frame to said axle, wheels mounted on said axle, a fifth wheel rigidly mounted on said frame and adapted to engage and support the unsupported end of a semi-trailer, an A-frame having spaced legs extending between said frame and said axle and intermediate said wheels, said legs being pivotally attached to said frame at points spaced above and in back of said axle, and means at the forward end of said A-frame for coupling the dolly to a towing vehicle.

7. A trailer dolly for converting a semi-trailer into a full trailer comprising a frame, an axle for said frame, wheels mounted on said axle, a fifth wheel on said frame, and a draw bar pivotally attached to said frame at a point spaced a predetermined distance above and in back of said axle such that the dolly can be pivoted backward about said axle until the said draw bar strikes the axle, at which time the fifth wheel is positioned at an acute angle with the draw bar.

8. A trailer dolly for converting a semi-trailer into a full trailer comprising a frame, an axle, a pair of leaf springs on opposite sides of said dolly connecting said frame to said axle, wheels mounted on said axle, a fifth wheel rigidly mounted on said frame and adapted to engage and support the unsupported end of a semi-trailer, an A-frame having spaced legs extending between said frame and said axle and intermediate said wheels, said legs being pivotally attached to said frame at points spaced predetermined distances above and in back of said axle such that the dolly can be pivoted backward about said wheels until the said A-frame strikes the axle, at which time the fifth wheel is positioned at an acute angle with the A-frame.

WILLIAM B. JOHNSON.

REFERENCES CITED

The following references are of record in the file of this patent:

UNITED STATES PATENTS

| Number | Name | Date |
|---|---|---|
| 1,892,004 | Reid | Dec. 27, 1932 |
| 2,126,357 | Todd | Aug. 9, 1938 |
| 2,254,532 | Knox | Sept. 2, 1941 |